April 14, 1959  J. SCHOER  2,881,515
TRACTOR WHEEL PULLER
Filed Aug. 16, 1955
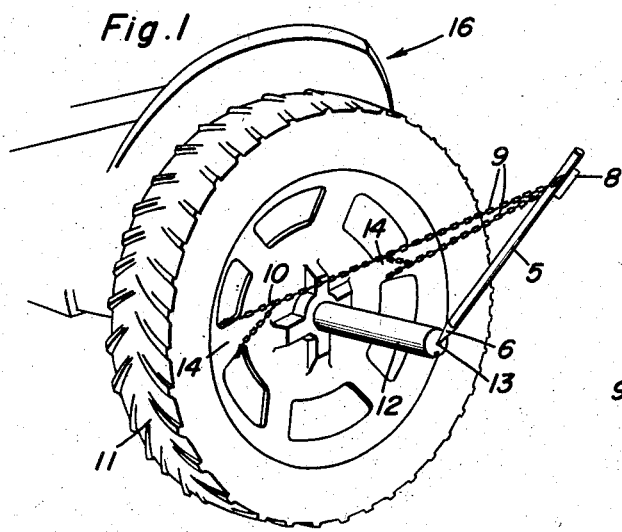
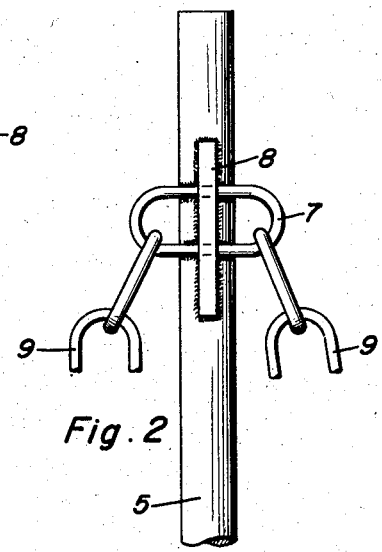
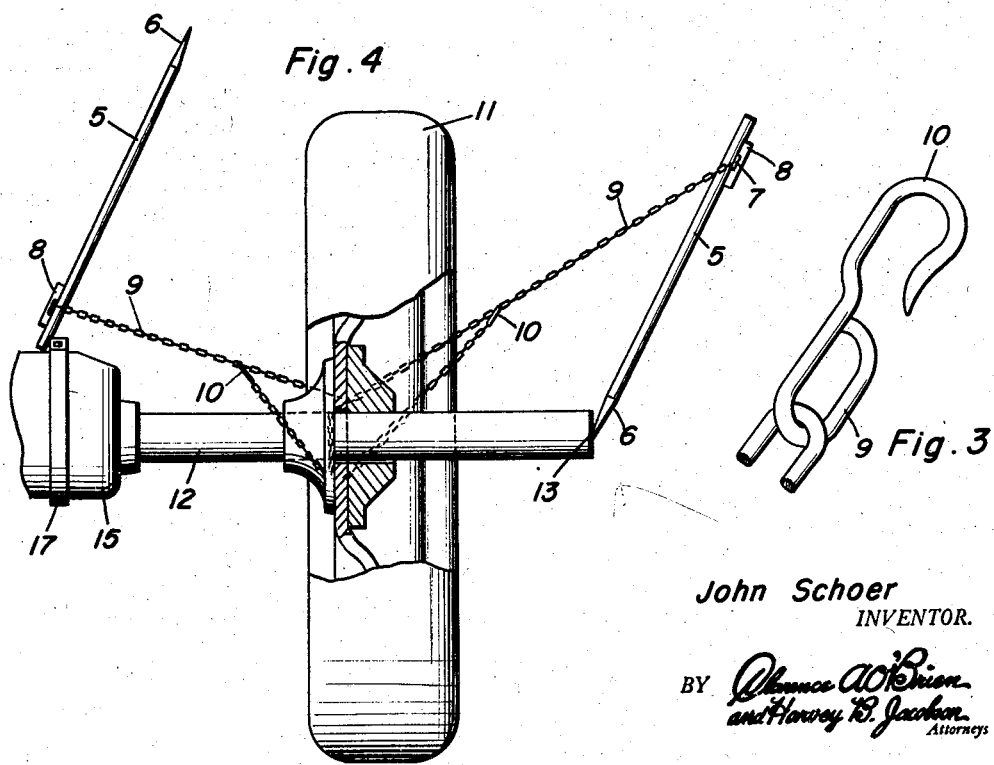
John Schoer
INVENTOR.
BY
Attorneys

2,881,515

TRACTOR WHEEL PULLER

John Schoer, Holstein, Iowa

Application August 16, 1955, Serial No. 528,591

1 Claim. (Cl. 29—267)

The present invention relates to new and useful improvements in wheel pullers particularly for tractors and has for its primary object to provide, in a manner as hereinafter set forth, novel means whereby the rear wheels of such vehicles may be expeditiously removed or adjusted to any desired position on the axle with a minimum of effort.

Other objects of the invention are to provide a tractor wheel tool of the aforementioned character which will be comparatively simple in construction, strong, durable, compact, highly efficient and reliable in use and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view, showing a tool constructed in accordance with the present invention in use for removing a tractor wheel;

Figure 2 is a view in front elevation of the upper portion of the device;

Figure 3 is a perspective view of the free end portion of one of the chains; and Figure 4 is an elevational view, partially in section, showing a method which may be employed for adjusting or shifting a tractor wheel on its axle.

Referring now to the drawing in detail, it will be seen that the embodiment of the invention which has been illustrated comprises a metallic lever 5 in the form of a bar or rod which may be of any suitable dimensions. At the lower end thereof, the lever 5 terminates in a point 6.

Secured transversely as by welding on the upper portion of the lever 5 is an intermediate link 7 of a logging chain 9. A metallic bar 8 is welded longitudinally on the lever 5 over the link 7 for strengthening or reinforcing the same. Log hooks 10 are mounted on the ends of the chain 9.

It is thought that the use or operation of the tool will be readily apparent from a consideration of the foregoing. In Figures 1 and 4 of the drawing, reference character 11 designates a conventional tractor wheel mounted on the usual axle 12. To slide the wheel 11 outwardly on the axle 12, as when removing said wheel, the pointed end 6 of the lever 5 is engaged in the usual socket 13 in the outer end of said axle. The end portions of the chain 9 are then looped around the spokes 14 of the wheel 11 and secured by the hooks 10. The lever 5 is then swung outwardly and downwardly for pulling the wheel 11 outwardly on the axle 12 in an obvious manner. The chain 9 is then shortened and the operation repeated as many times as may be necessary to pull the wheel to the outer end of the axle. To pull the wheel 11 inwardly on the axle 12, the lever 5 is reversed and the lower end thereof is engaged with any convenient abutment on the axle housing 15 of the tractor 16, such as, for instance, as the usual drawbar bracket 17. The lever 5 is then swung inwardly for pulling the wheel 11 inwardly on the axle 12. It will thus be seen that a tool has been provided whereby the tractor wheel may be expeditiously shifted or adjusted in either direction on the axle or removed therefrom.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A device for moving a spoked tractor wheel on an axle of a tractor which includes an axle housing having a projection thereon with the axle having an indentation in the end thereof, said device comprising an elongated rigid rod having a pointed end for engagement in the indentation in the end of the axle and a blunt end for engagement behind the projection on the axle housing, a chain link rigidly affixed to and extending transversely of the rod adjacent the blunt end thereof, a reinforcing bar extending longitudinally of the rod and rigidly affixed thereto in overlying relation to the chain link for reinforcing the chain link and rod, said bar terminating in spaced relation to the blunt end of the rod, a pair of chain members terminally attached to the chain link with one chain being disposed on each side of the bar, and a hook on the free end of each chain member for adjustable hooking engagement with the chain member to which the same is attached thereby forming a spoke encircling loop in the free end of each chain member and also adjusting the effective length of the chain members thereby enabling variation in the angular relation between the axle and the elongated rod when the pointed end of the rod is engaged with the indentation in the axle and when the blunt end of the rod is engaged with the projection on the axle housing for orientating the rod for converting the largest proportion of the pivotal force exerted on the rod to longitudinal force exerted on the tractor wheel for moving the wheel on the axle.

References Cited in the file of this patent

UNITED STATES PATENTS

| | | |
|---|---|---|
| 1,247,489 | Beachler | Nov. 20, 1917 |
| 1,261,164 | Quinlan | Apr. 2, 1918 |
| 1,311,836 | Norris | July 29, 1919 |
| 1,317,145 | Skantz | Sept. 23, 1919 |
| 1,457,795 | Pizzuti | June 5, 1923 |
| 2,489,413 | Hink | Nov. 29, 1949 |

FOREIGN PATENTS

| | | |
|---|---|---|
| 11,203 | Great Britain | Mar. 4, 1909 |